(12) United States Patent
Zhou

(10) Patent No.: US 11,952,030 B2
(45) Date of Patent: Apr. 9, 2024

(54) ELECTRIC LUGGAGE

(71) Applicant: Zhejiang Mambobaby Baby Products Co., Ltd., Yiwu (CN)

(72) Inventor: Weixin Zhou, Jinhua (CN)

(73) Assignee: Zhejiang Mambobaby Baby Products Co., Ltd., Yiwu (CN)

( * ) Notice: Subject to any disclaimer, the term of this patent is extended or adjusted under 35 U.S.C. 154(b) by 0 days.

(21) Appl. No.: 18/113,063

(22) Filed: Feb. 23, 2023

(65) Prior Publication Data

US 2023/0192170 A1 Jun. 22, 2023

(30) Foreign Application Priority Data

Oct. 20, 2022 (CN) .......................... 202222762947.9

(51) Int. Cl.
*B62B 5/06* (2006.01)
*A45C 5/03* (2006.01)
*A45C 5/14* (2006.01)
*A45C 9/00* (2006.01)
*A45C 13/26* (2006.01)
*A45C 13/28* (2006.01)
*B62B 3/02* (2006.01)
(Continued)

(52) U.S. Cl.
CPC .............. *B62B 5/0069* (2013.01); *A45C 5/03* (2013.01); *A45C 5/14* (2013.01); *A45C 9/00* (2013.01); *A45C 13/262* (2013.01); *A45C 13/28* (2013.01); *B62B 3/02* (2013.01); *B62B 5/0036* (2013.01); *B62B 5/0053* (2013.01); *B62B 5/04* (2013.01); *B62B 5/06* (2013.01); *A45C 2009/005* (2013.01); *A45C 2013/265* (2013.01); *B62B 2202/24* (2013.01)

(58) Field of Classification Search
CPC ........... A45C 5/03; A45C 13/262; A45C 5/14; A45C 13/28; B62B 5/06; B62B 2202/24
See application file for complete search history.

(56) References Cited

U.S. PATENT DOCUMENTS 9,661,905 B2 * 5/2017 O'Donnell ............... A45C 5/03
10,649,465 B1 * 5/2020 Tang .................... G05D 1/0246
2003/0038010 A1 2/2003 Kuwayama
(Continued)

FOREIGN PATENT DOCUMENTS

CN 207152131 U * 3/2018
CN 108741511 A * 11/2018
(Continued)

*Primary Examiner* — Faye M Fleming
(74) *Attorney, Agent, or Firm* — Georgi Korobanov

(57) ABSTRACT

The present invention proposes an electric luggage, comprising: a luggage body, an electric chassis, a sensor and a controller. The luggage body is installed on the electric chassis; the front end of the electric chassis is provided with a steerable front handle; the bottom of the front handle is provided with a front wheel; the bottom of the rear end of the electric chassis or the luggage body is provided with a rear wheel; and the speed regulation and braking of the front wheel and/or the rear wheel are controlled through the sensor, the controller, and a battery pack electrically connected with the controller. The luggage body can be combined with the electric chassis to serve as a riding tool. Children can ride the luggage during a journey, which can make parents more relaxed.

9 Claims, 2 Drawing Sheets

(51) Int. Cl.
*B62B 5/00* (2006.01)
*B62B 5/04* (2006.01)

(56) References Cited

U.S. PATENT DOCUMENTS

2019/0183219 A1 6/2019 Yu
2020/0069018 A1 3/2020 Chiang

FOREIGN PATENT DOCUMENTS

CN 216994703 U * 7/2022
CN 115715621 A * 2/2023

* cited by examiner

ELECTRIC LUGGAGE

TECHNICAL FIELD

The present invention relates to the technical field of luggage, and particularly to an electric luggage.

BACKGROUND

A luggage, also known as a suitcase and a trolley case, is a box carried when going out to place items, which is used conveniently and widely. The luggage generally has a pull rod and rollers. It is convenient to drag when walking through the pull rod, so that the burden is greatly reduced. The luggage is also portable.

The luggage is mainly used for long-distance journeys, business trips and other activities. In real life, users often travel with children. However, children are easy to get tired during the journey. The users need to hold the children while carrying the luggage, which makes the journey inconvenient.

SUMMARY

The purpose of the present invention is to solve the problems in the prior art to propose an electric luggage. Children can use the luggage as a riding tool during a journey, which can make the journey easier for parents. Moreover, the electric luggage has the playing function of an electric toy car.

To achieve the above purpose, the present invention proposes an electric luggage, comprising: a luggage body, an electric chassis, a sensor and a controller. The luggage body is installed on the electric chassis; the front end of the electric chassis is provided with a steerable front handle; the bottom of the front handle is provided with a front wheel; the bottom of the rear end of the electric chassis or the luggage body is provided with a rear wheel; and the speed regulation and braking of the front wheel and/or the rear wheel are controlled through the sensor, the controller, and a battery pack electrically connected with the controller.

Preferably, the luggage body is detachably connected with the electric chassis.

Preferably, the luggage body is fitted and connected with the electric chassis by at least one inserting structure.

Preferably, any one of the luggage body and the electric chassis is provided with an inserting part, and the other one is provided with a chute which can be inserted and fitted with the inserting part.

Preferably, the sensor adopts the form of a paddle or a pedal or a rotating handle.

Preferably, the sensor in the form of the pedal has a retractable structure.

Preferably, the sensor in the form of the paddle or the rotating handle is installed on the front handle.

Preferably, the front handle is provided with a lifting bracket, and the lifting bracket is provided with a locking device.

Preferably, a hip seat is arranged above the luggage body, the hip seat is provided with a handle, and a cushion is arranged above the hip seat.

Preferably, the electric chassis is provided with a battery slot for installing the battery pack, and the battery pack is detachably connected with the battery slot.

The present invention has the following beneficial effects: the electric luggage of the present invention can be used as a riding tool. In addition, the luggage body and the electric chassis adopt a detachable installation structure. On the one hand, the luggage body can be combined with the electric chassis to form the electric luggage. The electric luggage can walk in a mode of electric drive, and can be used as a riding tool. Children can ride the luggage during a journey, which can make parents more relaxed, and the electric luggage has the playing function of an electric toy car. On the other hand, the luggage body and the electric chassis can be used independently after disassembled, and the items carried by the luggage body can be directly used. Moreover, when the rear wheel is arranged on the electric chassis, the electric chassis can be used independently and has the function of an electric scooter of children.

The features and advantages of the present invention will be described in detail through embodiments and in combination with the drawings.

DETAILED DESCRIPTION

Embodiment 1

Figure 1:
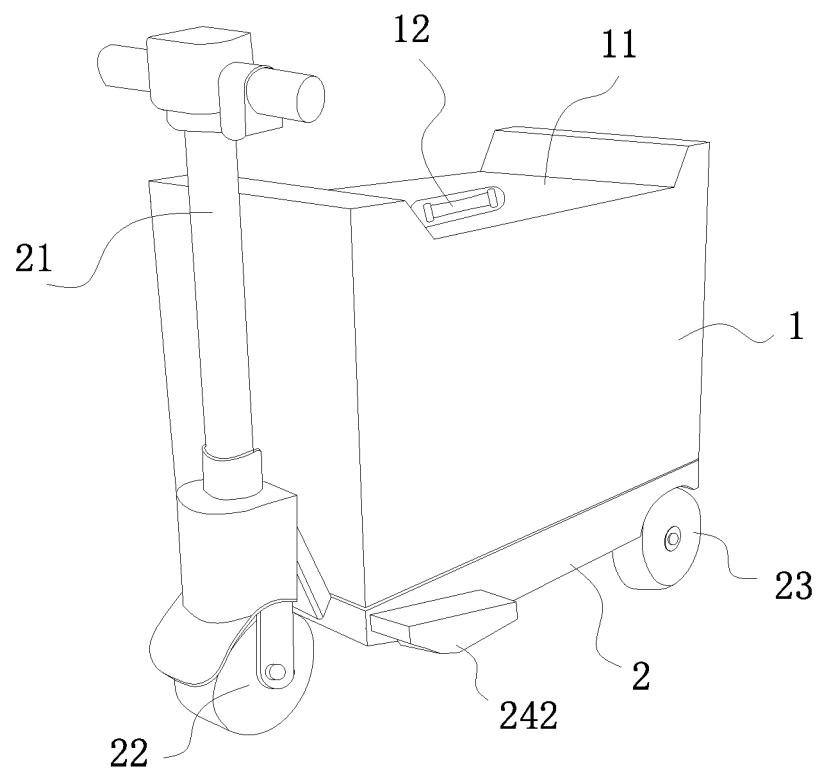
FIG. 1 is a structural schematic diagram of embodiment 1 of an electric luggage in the present invention.

By referring to FIG. 1, the present invention provides an electric luggage, comprising a luggage body 1, an electric chassis 2, a sensor and a controller. The luggage body 1 is installed on the electric chassis 2; the front end of the electric chassis 2 is provided with a steerable front handle 21; the bottom of the front handle 21 is provided with a front wheel 22; the bottom of the rear end of the electric chassis 2 or the luggage body 1 is provided with a rear wheel 23; and the speed regulation and braking of the front wheel 22 and/or the rear wheel 23 are controlled through the sensor, the controller, and a battery pack electrically connected with the controller. In the present embodiment, the luggage body 1 is combined with the electric chassis 2 through a mode of fixed connection. In use, the electric luggage walks in a mode of electric drive, and can be used as a riding tool. Children can ride the luggage body 1 during a journey, which can reduce the burden of parents.

Further, the sensor is in the form of a pedal 242. The sensor in the form of the pedal 242 has a retractable structure. Users can control the action of the electric luggage through the pedal 242.

Further, a hip seat 11 is arranged above the luggage body 1, and the hip seat 11 is provided with a cushion to improve the comfort of the users when riding on the luggage.

Further, the front handle 21 is provided with a lifting bracket, and the lifting bracket is provided with a locking device. In the present embodiment, the lifting bracket comprises a fixing bracket and a movable sleeve sleeved outside the fixing bracket. The size can be adjusted by lifting the movable sleeve and locked by the locking device, which can be applied to users of different heights. The front handle 21 is also provided with a control box, and the control box is provided with a power switch and an electric quantity display screen.

Further, the battery pack is detachably installed on the electric chassis 2. In the present embodiment, the rear part of the electric chassis 2 is provided with a battery slot for installing the battery pack, and the battery pack is provided with a charging interface.

Embodiment 2

Figure 2:
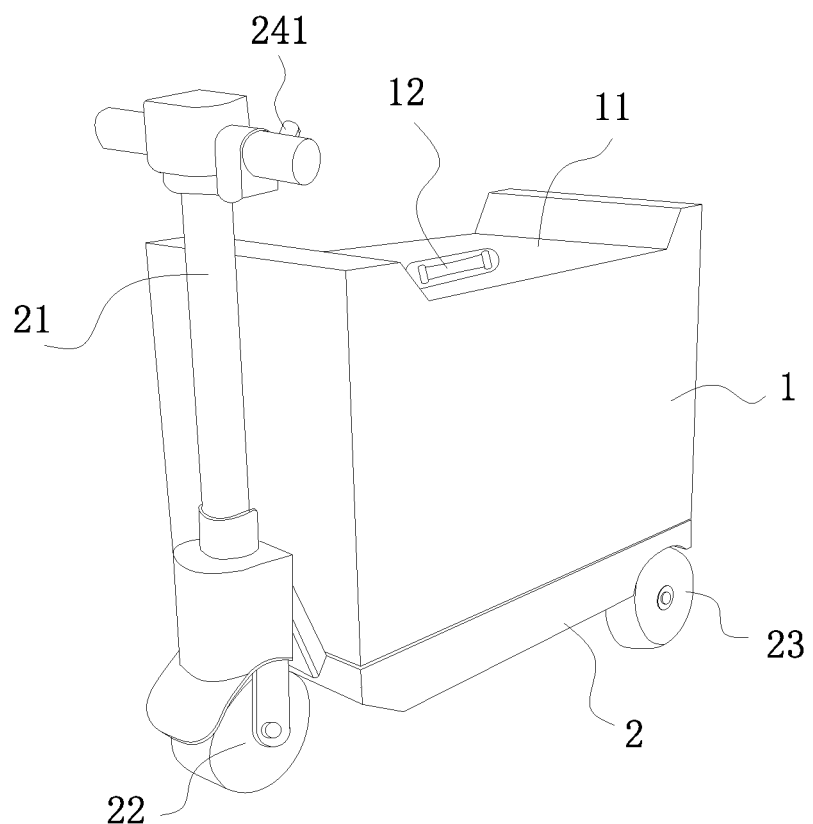
FIG. 2 is a structural schematic diagram of embodiment 2 of an electric luggage in the present invention.

By referring to FIG. 2, the present embodiment is different from embodiment 1 in that: the sensor adopts the form of a rotating handle or a paddle 241. Specifically, the sensor in the form of the paddle 241 or the rotating handle is installed on the front handle 21. The front handle 21 is provided with a speed regulation rotating handle and a brake rotating handle; the speed regulation rotating handle can be rotated circumferentially or provided with the paddle 241; the brake rotating handle can be rotated circumferentially; the speed regulation rotating handle is rotated circumferentially or the position of the paddle 242 is adjusted to realize speed regulation; and electronic braking can be realized by rotating the brake rotating handle circumferentially.

Embodiment 3

In the present embodiment, the luggage body 1 is detachably connected with the electric chassis 2. In the present embodiment, when the luggage body 1 is used in combination with the electric chassis 2, the electric luggage walks by the controller in a mode of electric drive, and can be used as a riding tool. Children can ride the luggage body 1 during a journey, which can reduce the burden of parents. When the luggage body 1 is removed from the electric chassis 2, items can be carried independently through the luggage body 1. In addition, if a rear wheel 23 is arranged on the luggage body 1, the items can be carried by pulling the luggage body 1. If the rear wheel 23 is arranged on the electric chassis 2, the users can carry the items by carrying the luggage body 1 by hands, and the electric chassis 2 can be used individually as a riding tool with the function of an electric scooter of children.

Further, in the present embodiment, the hip seat 11 is provided with a handle 12, and the handle 12 is located in a groove on the cushion, which may not affect the comfort of riding. Not only the handle 12 can be used for carrying with hands to transfer the position of the electric luggage entirely, but also the luggage body 1 can be carried independently through the handle 12 after the luggage body 1 is removed from the electric chassis 2.

Further, the luggage body 1 is fitted and connected with the electric chassis 2 by at least one inserting structure. Specifically, in the present embodiment, any one of the luggage body 1 and the electric chassis 2 is provided with an inserting part, and the other one is provided with a chute which can be inserted and fitted with the inserting part. The inserting structure is also provided with a locking mechanism. In the present embodiment, the locking mechanism adopts a locking bolt or buckle, and the luggage body and the electric chassis which are inserted and combined can be locked through the locking bolt or buckle.

The above embodiments are explanations of the present invention, not limitations to the present invention. Any solution after simple transformation of the present invention shall belong to the protection scope of the present invention.

What is claimed is:

1. An electric luggage, comprising a luggage body (1), an electric chassis (2), a sensor and a controller, wherein the luggage body (1) is installed on the electric chassis (2); the front end of the electric chassis (2) is provided with a steerable front handle (21); the bottom of the front handle (21) is provided with a front wheel (22); the bottom of the rear end of the electric chassis (2) or the luggage body (1) is provided with a rear wheel (23); and the speed regulation and braking of the front wheel (22) and/or the rear wheel (23) are controlled through the sensor, the controller, and a battery pack electrically connected with the controller,
wherein the luggage body (1) is detachably connected with the electric chassis (2).

2. The electric luggage according to claim 1, wherein the luggage body (1) is fitted and connected with the electric chassis (2) by at least one inserting structure.

3. The electric luggage according to claim 2, wherein any one of the luggage body (1) and the electric chassis (2) is provided with an inserting part, and the other one is provided with a chute which can be inserted and fitted with the inserting part.

4. The electric luggage according to claim 1, wherein the sensor adopts the form of a paddle (241) or a pedal (242) or a rotating handle.

5. The electric luggage according to claim 4, wherein the sensor in the foam of the pedal (242) has a retractable structure.

6. The electric luggage according to claim 4, wherein the sensor in the form of the paddle (241) or the rotating handle is installed on the front handle (21).

7. The electric luggage according to claim 1, wherein front handle (21) is provided with a lifting bracket, and the lifting bracket is provided with a locking device.

8. The electric luggage according to claim 1, wherein a hip seat (11) is arranged above the luggage body (1), the hip seat (11) is provided with a handle (12), and a cushion is arranged above the hip seat (11).

9. The electric luggage according to claim 1, wherein the electric chassis (2) is provided with a battery slot for installing the battery pack, and the battery pack is detachably connected with the battery slot.

* * * * *